Dec. 20, 1960   F. F. LAMBIASE   2,965,048
APPARATUS FOR PRODUCING THIN WAFER-LIKE CANDIES
Filed May 22, 1957
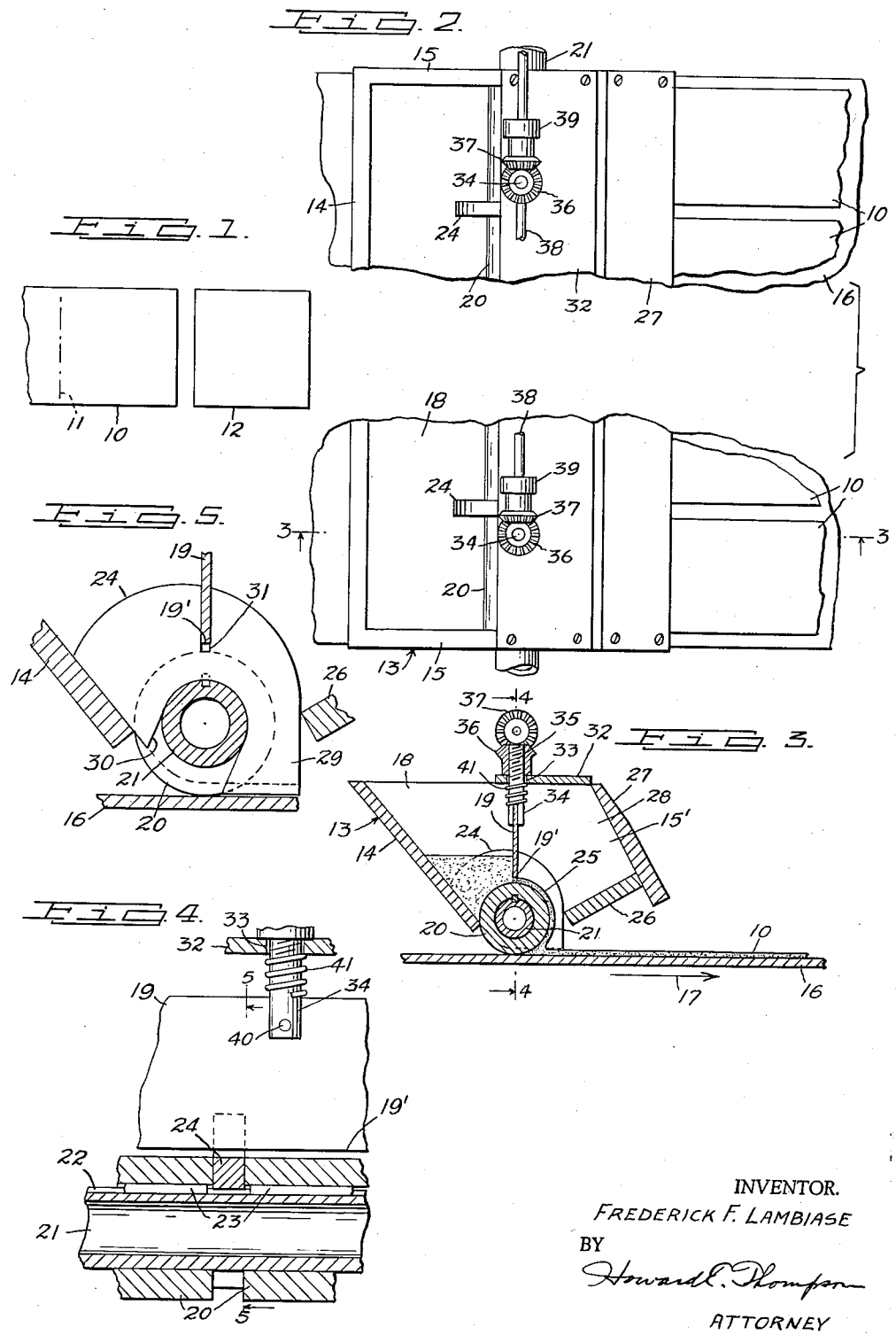
INVENTOR.
FREDERICK F. LAMBIASE
BY
Howard E. Thompson
ATTORNEY

United States Patent Office 2,965,048
Patented Dec. 20, 1960

2,965,048

APPARATUS FOR PRODUCING THIN WAFER-LIKE CANDIES

Frederick F. Lambiase, 467 Terrace Ave., Hasbrouck Heights, N.J., assignor of one-half to Fred Gregor, Brooklyn, N.Y.

Filed May 22, 1957, Ser. No. 660,782

6 Claims. (Cl. 107—27)

This invention deals with a device or apparatus for depositing on the conveyor belt of candy making machines, preparatory to the belt's passage into the cooling or setting station or tunnel, relatively thin ribbon-like strips, from which wafers are formed by first scoring and then severing the strips at intervals to form substantially square or other shaped wafers.

More particularly, the invention deals with a device or apparatus of the character described, having adjustable means controlling thickness of the initial deposit of candy onto delivery rolls rotated in a direction opposite to the direction of feed of the belt in the deposit of the ribbon-like strips on said belt.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic plan view showing a portion of a ribbon deposit of candy and the severance of one wafer from the end of said ribbon.

Fig. 2 is a broken plan of a device or apparatus for depositing a plurality of candy ribbons upon a belt, parts of a few ribbon deposits being diagrammatically illustrated, the central portion of the device or apparatus being broken away.

Fig. 3 is a section on the line 3—3 of Fig. 2, diagrammatically illustrating the candy in stippled lines deposited upon the feed belt.

Fig. 4 is a partial section on the line 4—4 of Fig. 3 on an enlarged scale, part of the construction being shown in elevation, and omitting representation of the candy; and Fig. 5 is a partial section on the line 5—5 of Fig. 4.

While my device or apparatus is adaptable for use in depositing of materials in ribbon-like fashion on a moving conveyor with a control of the thickness of the ribbon deposits, in illustrating one adaptation and use of my invention, I will deal with the production of candy, particularly, in forming comparatively thin wafers, patties or the like, which may comprise initially a deposit of chocolate or a cream or filling, later covered with chocolate in the known processes of producing candies.

From the foregoing, it will be apparent that, in referring hereafter to ribbon deposits of candies, these ribbon deposits can be of any consistency or combination which will maintain substantially ribbon-like form when deposited upon a belt and set or hardened in passing through the conventional and known cooling or setting station or tunnel.

In Fig. 1 of the drawing, I have diagrammatically illustrated, at 10, an end portion of a ribbon deposit of candy which, at a predetermined stage of setting, will have spaced scores, as indicated by the dot-dash line 11, to control the length of the resulting wafer 12. As shown in Fig. 1, the wafer 12 is square in form. However, it will be apparent that it can be elongated in form or have other contours, as will later appear.

In Figs. 2 and 3, I have diagrammatically shown, at 13, what might be termed the depositing unit of the device or apparatus. This unit comprises a more or less hopper-shaped casing, defined by a downwardly contracted front wall 14 and side walls 15, the latter being spaced apart to control the lay of ribbons to be deposited upon the candy receiving conveyor belt. In referring to lay of ribbons, it will be understood that the unit can be formed to lay a relatively small number or a large number of ribbons upon the conveyor or feed belt of a candy machine, the belt being illustrated, in part, at 16 in Figs. 2, 3 and 5.

The unit 13 is positioned just in front of or closely adjacent to the cooling or setting station or tunnel of the candy making machine. No showing of the tunnel is deemed to be necessary, as this is well-known in the art.

In Fig. 3 of the drawing, I have shown an arrow 17 indicating the direction of travel of the belt 16 to the tunnel.

The hopper 18 of the casing is completed by a vertically adjustable feed control plate 19, which is movable toward and from a plurality of delivery rolls 20, which form a closure to the bottom of the hopper 18, the rolls fitting snugly upon the lower end of the front walls 14.

The rolls 20 are mounted on and keyed to a tubular drive shaft 21, the shaft having an elongated keyway 22 receiving independent keys 23 for each of the rolls 20. The rolls 20 are divided by partitioning shoes 24, which fit directly upon the tubular drive shaft 21, as clearly noted in Fig. 5; thus the hopper is divided by the partitions 24 into a series of discharges for depositing on the tubular rolls 20 ribbonlike deposits of candy, as diagrammatically seen at 25 in Fig. 3, which, in turn, are deposited upon the upper surface of the belt 16 in the ribbons 10, as previously described. In this connection, it will be apparent that the rolls 20 are rotated in a clockwise direction or, in other words, against the feed movement of the belt 16 so that the belt will pick up and deliver the ribbon-like deposits from the rolls, in the manner as diagrammatically illustrated in Fig. 3.

By employing a tubular drive shaft 21, heating or cooling mediums can be transmitted through the shaft to control temperatures of the material, such as the candy deposited upon the rolls 20 and delivered from the rolls onto the belt 16.

It is also pointed out, at this time, that, with a definite spacing of the lower edge 19' of the feed control plate 19, a predetermined thickness of the material can be deposited upon the rolls 20 and, with one controlled speed of rotation of the shaft 21, this same thickness can be maintained on the belt 16. However, by increasing the speed of rotation of the shaft 21, an excess of delivery of the material to the belt will result, thus increasing the thickness of the material deposited on the belt, as compared with the control thickness by the edge 19'. This latter excess delivery to the belt is checked and controlled, however, by a bottom wall portion 26 on the rear extensions 15' of the side walls 15 which, in conjunction with an upwardly extending back wall 27, form a supplemental chamber 28 rearwardly of the plate 19.

The partitions or shoes 24 have heel-like rear extensions 29, which extend into close proximity to the belt 16, noted in Fig. 5, and the lower portions of these shoe have openings, as at 30, to facilitate attachment and detachment of the shoes with the shaft 21.

In this connection, it will be understood that, by varying the length of the tubular rolls 20, the width of the ribbon-like deposits of material on the belt 16 can be changed and this can be done without modifying the shoes 24 or any other structure of the unit 13 as a whole.

It will also appear that the upper edge portions of the shoes 24 have vertical slits 31 to receive the feed control plate 19, the slits being sufficiently deep to bring the lower edge 19' of the plate 19 into close proximity with respect to the surface of the rolls 20, as is apparent from a consideration of Fig. 5.

At the rear portion of the unit is a transverse top wall 32, which forms a closure for the chamber 28. The top wall has spaced apertures 33, in which are freely arranged rods 34, having upper worm ends, diagrammatically illustrated at 35 in Fig. 3. On these worm ends are mounted bevelled pinions 36, meshing with corresponding pinions 37, keyed to an elongated shaft 38 supported in suitable bearings 39 fixed to the top wall 32. Note, in this connection, Fig. 2 of the drawing.

It will thus be seen that, in rotation of the shaft 38, the spaced rods 34 can be simultaneously moved upwardly and downwardly, the lower ends of the rods being slotted to receive the upper ends of the plate 19, to which said rods are fixed, as indicated at 40 in Fig. 4. The upper edge of the plate 19 is spaced from the top wall 32 and, in this space, springs 41 are arranged on the rods 34 to maintain the adjustment of the plate under a tension feed control at all times. The spacing and clearance between the upper edge of the plate 19 and the top wall 32 will be controlled to govern the maximum spacing of the lower edge 19' of the plate 19 with respect to the delivery rolls 20.

While, in most instances, the unit 13 will be maintained in a predetermined position upon the top of the belt 16, in some instances, it would be desirable to intermittently move the unit transversely of the path of belt travel to vary or modify the ribbon lay upon the belt, in which event, irregular side edges will be provided on the resulting ribbon deposits 10. This proposed transverse intermittent movement can be automatically performed and controlled with regard to speed proportioned to the speed of the belt travel and, in some instances, could be manually controlled by simply providing supports for the unit, over which the unit may be freely moved in the transverse direction with respect to belt travel.

In using the apparatus for the production of candies, as herein illustrated, the unit 13 is maintained in a temperature environment consistent with the temperature of the candy deposited into the hopper 18, so as to avoid any pre-setting or hardening of the candy, preparatory to passage into the setting or cooling station. In this connection, the control of temperature of the rolls 20 by the medium introduced into the tubular shaft 21 can be an important factor.

At an appropriate time during the setting period of the ribbon deposits, the same can be transversely or otherwise scored, as indicated at 11 in Fig. 1, so as to facilitate the severance of the wafers or the like 12 from the ends of the ribbons, preparatory to further processing these candies or packaging the same.

In referring to further processing, the ribbon deposits can be of a cream or filling, over which a chocolate or other coating can be applied, as with other candies in the known methods of candy making. It will also be apparent that, during the setting stage, deposits of other elements upon the ribbons can be performed prior to formation of the resulting end products or wafers. To illustrate this latter method of procedure, it will be apparent that chopped nuts can be deposited upon the ribbons, prior to the setting of the candy, so that these deposited elements will adhere to the ultimate end product.

In carrying out my improved method, it will also be apparent that the lower edge 19' of the feed control plate 19 can be of irregular contour or, in other words, have spaced apertures or recesses of varied contours to modify or vary the thickness of the lay of the ribbons upon the belt 16. In other words, instead of having a common thickness throughout, each ribbon may have one or more longitudinally extending thickened portions. No attempt is made here to illustrate this variation, as will be quite apparent to those skilled in the art.

For purposes of description in considering the device or apparatus for general uses, the ribbon-like deposits, as at 10, may be of any desired materials or combinations of materials and these ribbon-like deposits, at predetermined stations, can be fashioned or severed into a plurality of independent members, which may be termed end products, such, for example, as the wafers or patties, hereinbefore referred to.

With my improved method, it will be understood that the rolls 20 have a pressure contact upon the belt to effect what might be termed a wiping-off of the material or candy in transmitting the same in the form of the ribbon deposits upon the conveyor. It will be understood, in this connection, that the consistency of the material or candy is such to facilitate this wiping-off transfer.

The chamber 28 in the casing can be utilized for the arrangement of heating or cooling mediums for maintaining the desired temperature to the materials deposited onto and moving over the rolls prior to transmission onto the conveyor. This, in combination with the use of similar mediums in the tubular shaft, will provide a controlled or balanced operation in maintaining the material or candy in the desired condition during the transfer stage.

Having fully described my invention, what I claim as new and desire to secure by Letters Patent is:

1. In apparatus of the character described, an elongated conveyor, a depositing unit arranged transversely of the conveyor and the path of movement thereof, said unit employing a plurality of delivery rolls divided by partitioning elements, said rolls being arranged directly upon the conveyor and being rotated in a direction opposed to the direction of travel of said conveyor, means adjustable toward and from the rolls to control the thickness of the lay of material deposited upon the rolls in transmitting, by said rolls, ribbon-like deposits of said material in predetermined thickness upon the conveyor in movement of said conveyor relatively to the rolls, said last named means comprising a feed control plate, means adjusting an edge of said plate toward and from said rolls, said elements comprising shoes apertured to receive said plate, and said shoes spacing the material in forming the ribbon-like deposits on said conveyor.

2. In apparatus of the character described, an elongated conveyor, a depositing unit arranged transversely of the conveyor and the path of movement thereof, said unit employing a plurality of delivery rolls divided by partitioning elements, said rolls being arranged directly upon the conveyor and being rotated in a direction opposed to the direction of travel of said conveyor, means adjustable toward and from the rolls to control the thickness of the lay of material deposited upon the rolls in transmitting, by said rolls, ribbon-like deposits of said material in predetermined thickness upon the conveyor in movement of said conveyor relatively to the rolls, said last named means comprising a feed control plate, means adjusting an edge of said plate toward and from said rolls, said elements comprising shoes apertured to receive said plate, said shoes spacing the material in forming the ribbon-like deposits on said conveyor, and said rolls being mounted on and keyed to a tubular shaft for rotating said rolls.

3. In apparatus of the character described, an elongated conveyor, a depositing unit arranged transversely of the conveyor and the path of movement thereof, said unit employing a plurality of delivery rolls divided by partitioning elements, said rolls being arranged directly upon the conveyor and being rotated in a direction opposed to the direction of travel of said conveyor, means adjustable toward and from the rolls to control the thickness of the lay of material deposited upon the rolls in transmitting, by said rolls, ribbon-like deposits of said material in predetermined thickness upon the conveyor in movement of said conveyor relatively to the rolls, said last named means comprising a feed control plate, means adjusting an edge of said plate toward and from said rolls, said elements comprising shoes apertured to receive said plate, said shoes spacing the material in forming the ribbon-like deposits on said conveyor, said rolls being mounted on and keyed to a tubular shaft for rotating said rolls, and said partitioning shoes being detachable with respect to said shaft, thereby adapting the unit for use of rolls of different dimensions in controlling width of ribbon-like deposits of the material on said conveyor.

4. In apparatus of the character described, an elongated conveyor, a depositing unit arranged transversely of the conveyor and the path of movement thereof, said unit comprising a tubular shaft, a plurality of delivery rolls keyed to said shaft, said rolls being spaced by partitioning elements extending to and engaging the shaft, said rolls being arranged directly upon the conveyor and being rotated in a direction opposed to the direction of travel of said conveyor, said elements having apertures extending to the surface of said rolls, and a feed control plate mounted in said apertures and adjustable toward and from the rolls to control the thickness of lay of the material deposited upon the rolls in transmitting, by said rolls, ribbon-like deposits of said material in predetermined thickness upon the conveyor in movement of the conveyor relatively to said rolls.

5. In apparatus of the character described, an elongated conveyor, a depositing unit arranged transversely of the conveyor and the path of movement thereof, said unit comprising a tubular shaft, a plurality of delivery rolls keyed to said shaft, said rolls being spaced by partitioning elements extending to and engaging the shaft, said rolls being arranged directly upon the conveyor and being rotated in a direction opposed to the direction of travel of said conveyor, said elements having apertures extending to the surface of said rolls, a feed control plate mounted in said apertures and adjustable toward and from the rolls to control the thickness of lay of the material deposited upon the rolls in transmitting, by said rolls, ribbon-like deposits of said material in predetermined thickness upon the conveyor in movement of the conveyor relatively to said rolls, and means engaging the plate at spaced intervals for adjusting said plate.

6. A depositing unit for depositing ribbon-like strips of material upon a moving conveyor, said unit comprising a casing, a tubular shaft rotatably mounted in the lower portion of the casing, a plurality of partitioning shoes spaced longitudinally of and engaging the shaft, rolls keyed to the shaft and disposed between and spaced by said partitioning shoes and side walls of the casing, said shoes having apertures extending to the surface of said rolls, a feed control plate adjustably supported in the casing and movable in said apertures toward and from said rolls, said plate dividing one side of the casing into a hopper, into which material is adapted to be arranged, spacing of the plate with respect to the surface of the rolls controlling initial deposit of material from the hopper onto the surface of the rolls, and said rolls being driven in a direction opposed to the feed of said conveyor to thereby transfer the deposits of material on the rolls to the surface of the conveyor in forming ribbon-like deposits.

References Cited in the file of this patent
UNITED STATES PATENTS

| | | |
|---|---|---|
| 1,561,315 | Enciso | Nov. 10, 1925 |
| 1,915,528 | Haug | June 27, 1933 |
| 1,975,326 | Loose et al. | Oct. 2, 1934 |
| 2,256,190 | Bowman | Sept. 16, 1941 |
| 2,439,899 | Monaco | Apr. 20, 1948 |
| 2,693,154 | Appleton | Nov. 2, 1954 |
| 2,909,131 | Bauer | Oct. 20, 1959 |

FOREIGN PATENTS

| | | |
|---|---|---|
| 472,249 | Germany | Feb. 22, 1929 |

OTHER REFERENCES

Danger (German) application Serial No. D-18,800 printed July 5, 1956 (Kl.2b.14.03).